April 30, 1963  L. P. NORMAND, JR  3,087,510
STOP COCK CHOKE VALVE FOR OIL LINES
Filed Dec. 19, 1960  3 Sheets-Sheet 1
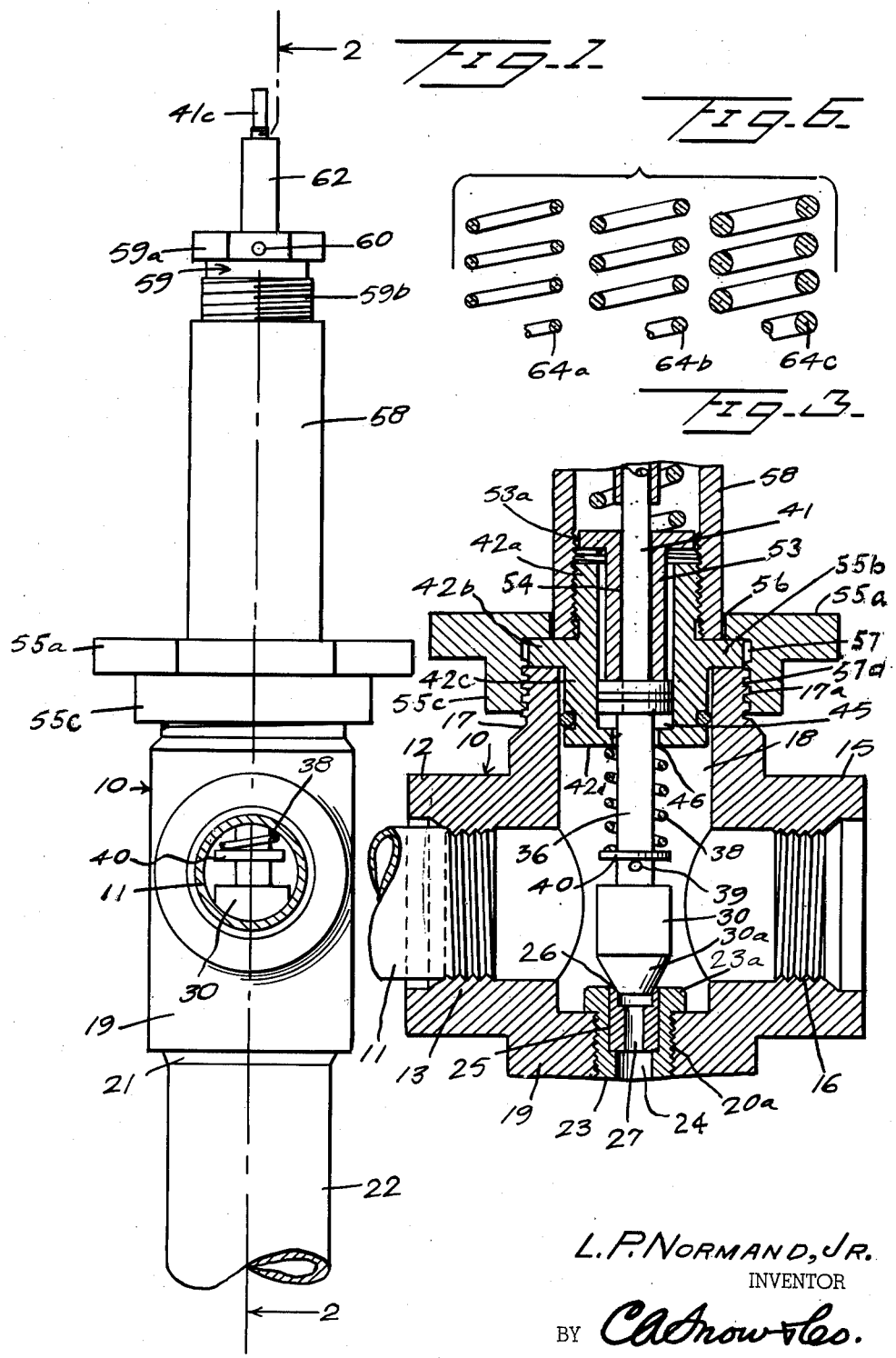
L. P. NORMAND, JR.
INVENTOR
BY *C. A. Snow &Co.*
ATTORNEYS.

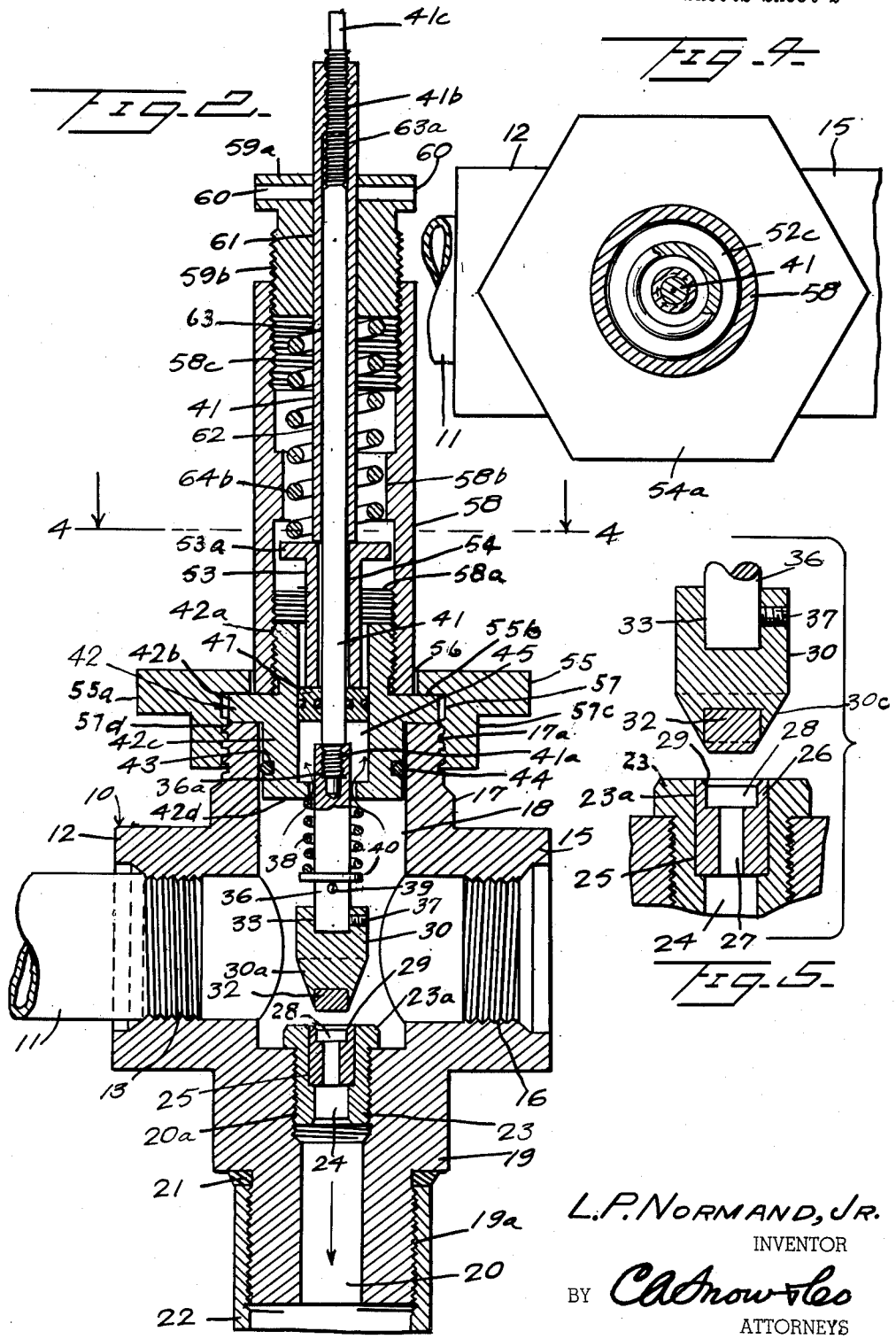

April 30, 1963    L. P. NORMAND, JR    3,087,510
STOP COCK CHOKE VALVE FOR OIL LINES
Filed Dec. 19, 1960    3 Sheets-Sheet 3
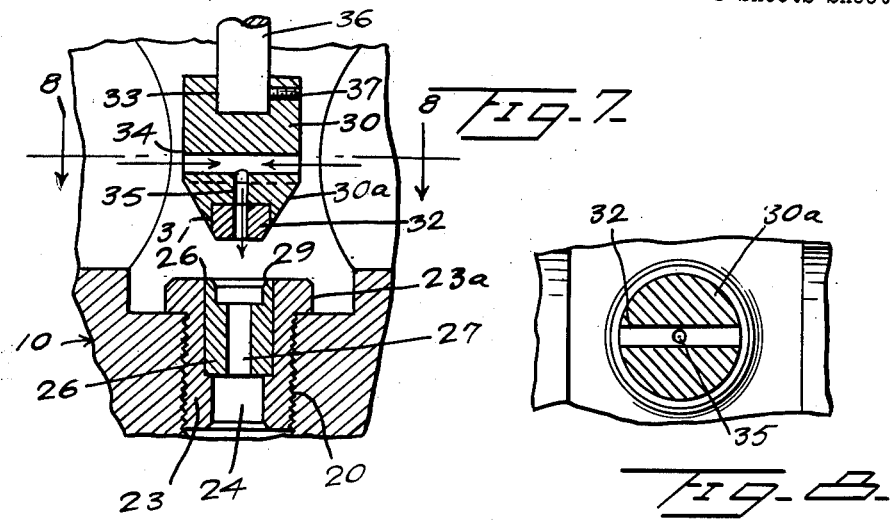
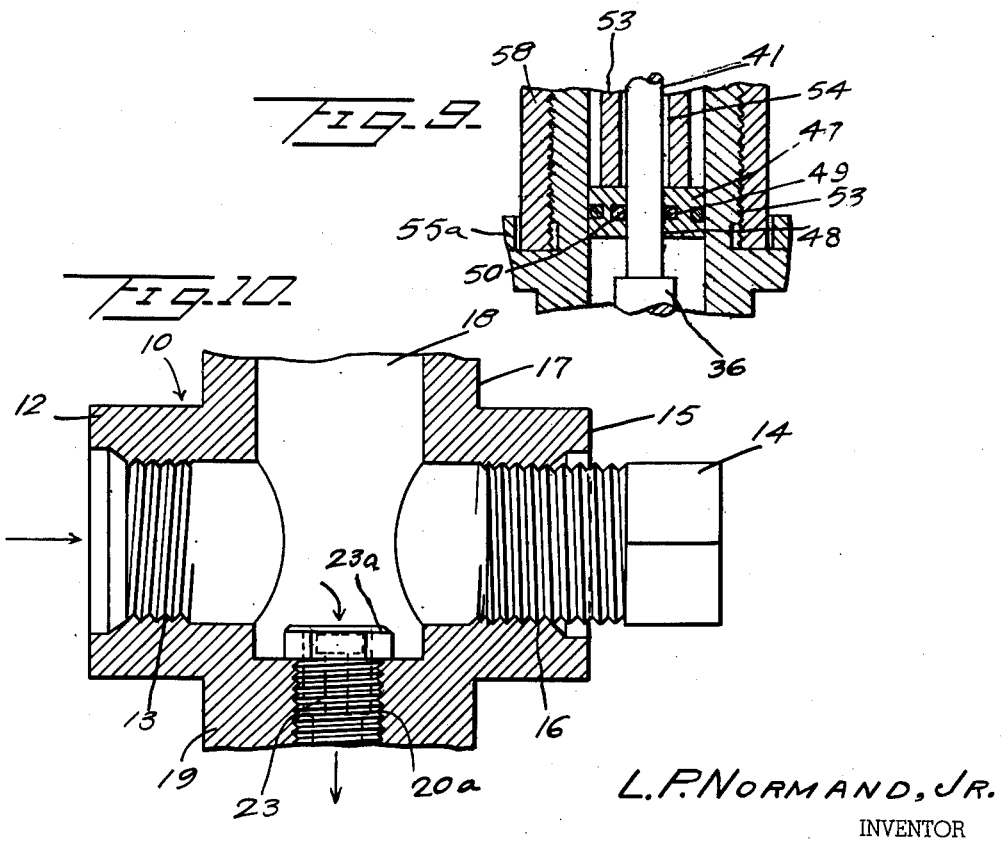
L. P. NORMAND, JR.
INVENTOR
ATTORNEYS.

United States Patent Office 3,087,510
Patented Apr. 30, 1963

3,087,510
STOP COCK CHOKE VALVE FOR OIL LINES
Lestan P. Normand, Jr., 3330 French Road,
Beaumont, Tex.
Filed Dec. 19, 1960, Ser. No. 76,917
1 Claim. (Cl. 137—509)

This invention relates to a choke valve of the stop cock variety for use on the lines from the well heads on oil wells.

An object of the present invention is to provide a choke valve which will shut off the line from an oil well head at low pressure and open same at high pressure.

Another object of the present invention is to provide a choke valve which can be used for gas lift operations, gas transmission, well control and in other operations where a stop choking effect is required.

A further object of the present invention is to provide a choke valve which is operated by the line pressure in the string for controlling the elevation of gas from the well tubing.

An additional object of the present invention is to provide a choke valve from the oil line from a well head in which the movable valve member is shifted from the open to the closed position, and vice versa, by a free piston operating on the differential in pressure between the oil line and the back pressure in the valve casing.

Still other objects, advantages and improvements will become apparent from the following specification, taken in connection with the accompanying drawings, in which:

FIGURE 1 is an end elevational view of a stop cock choke valve according to the present invention.

FIG. 2 is a vertical sectional view, taken on the section line 2—2 of FIG. 1 and looking in the direction of the arrows.

FIG. 3 is a detail vertical sectional view, similar to FIG. 2, but showing the valve member in seated position.

FIG. 4 is a horizontal sectional view, taken on the section line 4—4 of FIG. 2 and looking in the direction of the arrows.

FIG. 5 is a detail sectional view, showing the movable valve seat in the choke member.

FIG. 6 is a detail sectional view showing three (3) different sizes of springs that may be used with the piston gland.

FIG. 7. is a detail sectional view similar to FIG. 5, but showing a modified form of valve member, which provides for a bleeder flow through the valve even when the latter is closed.

FIG. 8 is a horizontal sectional view, taken on the section line 8—8 and looking in the direction of the arrows.

FIG. 9 is a detail sectional view showing the floating piston; and

FIG. 10 is a detail vertical sectional view through the valve body showing one opening of the latter closed by a bull plug.

Referring now to the drawings in detail, and to FIGS. 2 and 3 in particular, the principal component of the stop cock choke valve according to the present invention, is a body 10. This body 10 has thereon opposed bosses 12 and 15 which have internally threaded bores 13 and 16 therein, respectively. An inlet pipe 11 from the well head (not known) is received in the threaded bore of one of the bosses, for instance 12. A similar pipe (not shown) may be connected in the threaded bore 16 of the boss 15. This may be a line for a by-pass or an inlet line from another well. Alternatively, the threaded bore 16 through the outlet boss 15 may be closed off by a bull plug 14, as shown in FIG. 10.

At its top and at right angles to the inlet boss 12 and the outlet boss 15, the body 10 is formed with a third boss 17, which has screw threads 17a on its exterior and a bore 18 therethrough.

Likewise at its bottom and also at right angles to the inlet boss 12 and the outlet boss 15, the body 10 is formed with a fourth boss 19, which is a branch outlet boss. This latter boss has external screw threads 19a thereon and an axial bore 20 therethrough. A pipe 22 is received on the boss, a gasket 21 being positioned between the end of the pipe 22 and the body of the valve.

Where a main inlet pipe (not shown) from another well is connected to the threaded bore 16 through the outlet boss 15, the stop cock choke valve acts as a diverter to take part of the flow from the main line and turn it into the branch line 22.

The axial bore 20 through the branch outlet boss 19 is enlarged at its upper end by an internally threaded counterbore 20a. A bushing 23 has a hexagonal head 23a and external screw threads along the remainder of the body and is received in the internally screw threaded counterbore 20a in the boss 19. This bushing 23 has an axial bore 24 therethrough, which is enlarged by a counterbore 25 extending from the top downwardly. The choke member 26 is received in the counterbore 25 in the bushing 23. This choke member has an axial bore 27 therethrough, which is enlarged at its top by a counterbore 28 which extends downwardly. This counterbore 28 is levelled at its top at 29 to form a valve seat.

The bushing 23 may be removed and replaced through the use of a suitable socket wrench (not shown), which grips the hexagonal head 23a and has its shank positioned axially of the bore 18 through the top boss 17. It is contemplated that several choke members 26 will be provided with axial bores 27 of different diameters through same. The range of diameters of the axial bores 27 through the choke members 26 will preferably be from $\frac{1}{8}''$ to $\frac{63}{64}''$. Since the choke member 26 is force fitted in the counterbore 25 in the bushing 23, the latter may be removed and replaced with a choke member having an axial bore of a different diameter by unscrewing the bushing, forcing the choke member out of same, inserting a different choke member, and replacing the bushing.

A valve plug 30 is of generally cylindrical shape, but has a frusto-conical bottom 30a. An axial bore 31 is formed in the smaller base of the frusto-conical bottom 30a and an axial bore 33 in the top of the cylindrical body 30. The axial bore 31 receives a valve member 32, which may be of any suitable soft metal, such as Babbitt metal. This valve member is adapted to contact the valve seat 29 in the choke member 26 to close off flow through the valve.

The upper axial bore 33 in the valve plug 30 receives the lower end of a cylindrical valve stem 36, which is secured in place by a set screw 37, the latter extending through a radially positioned screw threaded hole in the valve plug.

At its upper end the valve stem 36 is formed with an axial screw threaded bore 36a, which receives the lower screw threaded end 41a of a valve adjusting rod 41. Since this valve adjusting rod is of lesser diameter than the valve stem 36, a shoulder is formed at the juncture of the two. The valve adjusting rod 41 is also screw threaded at 41b adjacent its upper end and at its upper end has a square section 41c for the reception of a wrench.

A cylinder 42 has an external flange 42b, which rests on the top of the upper boss 17 of the valve body, with the part 42c of the cylinder below this flange being received in the bore 18 through the boss 17. Above the flange 42b the cylinder is reduced in diameter and threaded at 42a. The lower part 42c of the cylinder has a circumferential groove 43, therein, which groove receives a packing ring 44. This packing ring forms a fluid-tight joint between the lower part 42c of the cylinder and the wall of the bore 18 through the boss 17. An axial bore 45 is formed substantially through the cylinder 42 from the top to a transverse plane adjacent the bottom, leaving an internal flange 42d.

A coiled compression spring 38 surrounds the cylindrical valve stem 36 and at its upper end abuts the inturned flange 42d on the cylinder 42 and at its lower end an apertured plate 40 which surrounds the valve stem. A pin 39 is diametrically positioned in a hole through the valve stem 36 and holds this plate against downward movement. This spring 38 serves to bias the valve plug 30 and the valve member 32 toward the valve seat 29 in the choke member 26.

The inturned flange 42d on the cylinder 42 has an axial hole 46 therethrough, which hole receives the cylindrical valve stem 36 with considerable clearance. This clearance between the wall of the hole 46 and the valve stem 36 provides for the admission of fluid under pressure from the bore 18 through the boss 17 into the piston chamber 45, as indicated by the arrows on FIG. 2.

The piston 47 reciprocates freely in the piston chamber 45. It has an axial bore 48, which freely receives the valve adjusting rod 41. Along the midplane of the piston there are formed internal and external grooves 49 and 51, respectively. The internal groove 49 receives a packing ring 50, which forms an air-tight seal with the valve adjusting rod 41; likewise, the external groove 51 receives a packing ring 52, which forms a fluid-tight seal with the wall of the bore 18 through the boss 17.

The floating piston 47 is moved upwardly by the pressure of the fluid entering the piston chamber 45 through the hole 46 in the flange 42d of the cylinder 42 and between the wall of the latter and the cylindrical valve stem 36, as above described. At the limit of its upper movement it strikes the sleeve of the spacing member 53. This spacing member has an axial bore 54 which freely receives the valve adjusting rod 41, and at its top an integral flange 53a. On its movement in the opposite direction the piston 48 is forced downwardly by the compressive force of a spring 64b which bears on the flange 53a of the spacing member, as will be later described. At the limit of its downward movement, the piston 47 strikes the valve stem 36 on the shoulder between the top of the latter and the valve adjusting rod 41, to force the valve plug 30 and the valve member 32 firmly onto the valve seat 29 in the choke member 26.

A bonnet 55 is comprised by a top 55a, which is hexagonal for the reception of a movable wrench, and an internal cylindrical bottom 55c. An axial bore 56 extends part of the way through the top 55a and a counterbore 57 extends from the bottom upwardly. At its top the counterbore 57 forms an internal flange 55b and at its bottom is internally threaded at 57d. The bonnet is received on the boss 17 with its internal threads 57d engaging the external threads 17a on the latter and the internal flange 55b engaging the flange 42b on the cylinder 42 and holding the latter against the top of the boss 17.

A guide cylinder 58 has an interiorly threaded bore 58a extending from its lower end upwardly and an internally threaded bore 58c extending from its upper end downwardly. The two bores stop short of the transverse mid-plane to form an internal shoulder 58b. This guide cylinder is received at its lower end within the axial bore 56 in the bonnet 55 and on the upper reduced threaded end 42a on the cylinder 42.

In the top of the guide cylinder 58 there is mounted an adjusting nut 59. This nut preferably has a hexagonal head 59a, the latter having aligned holes 60 in parallel sides for the reception of lugs on a spanner wrench. The nut also has a cylindrical threaded bottom 59b, which is received in the upper internally threaded end 58c of the guide cylinder and an axial bore 61.

In the bore 61 through the adjusting nut 59 there is positioned an adjusting sleeve 62. This sleeve has an internal bore 63 therethrough, which receives the valve adjusting rod 41, and this bore is internally threaded at its upper end at 63a, the threads engaging with the threads 41b on the upper end of the valve adjusting rod 41. At its lower end the adjusting sleeve 62 abuts the flange 53a on the spacing member 53.

A coiled compression spring 64b surrounds the adjusting sleeve 62 and at its top abuts the adjusting nut 59 and at its bottom the flange 52a on the spacing member 53. The internal shoulder 58b on the cylinder 58 receives the spring 64b with close clearance and forms a guide for same. As shown in FIG. 6, the spring 64 may be provided in a plurality of forms 64a, 64b and 64c, these forms differing in the diameters of the spring wire or rod so as to have different moduli of electricity.

In some cases it may be desirable to have a slight flow often called a bleader flow, through the stop cock choke valve, even when the valve member 32 on the plug 30 is seated on the valve seat 29 in the choke member 26. In such case the flow may be through a small diameter bore in the valve plug 30 and valve seat 32 with a larger diameter bore 27 in the choke member 26. To provide such a bleeder flow, a diametrical bore 34 is formed through the valve plug 30 and an intersecting axial bore 35 through the frusto-conical bottom 30a of the valve plug and the valve member 32, as shown in FIG. 7. As pointed out above, the choke member 26 is removable from the bushing 28 and replaceable with another choke member 26 having a different diameter axial bore 27 therein. It is also the case that the valve member 32 is removable from the bottom axial bore 31 in the valve plug 30 and replaceable with another valve plug having an axial bore 35 of a different diameter therethrough.

In operation the stop cock choke valve according to the present invention operates on the line pressure through the pipe 11, this pressure being applied to the floating piston 47. Through the adjusting nut 59 the compression of the spring 64b may be increased and the valve plug 30 set for closing at any desired low pressure. As the pressure decreases, the spring 64b moves the floating piston 47 downward until it contacts the shoulder between the valve adjusting rod 41 and the valve stem 36, thus seating the valve member 32 on the valve seat 29 in the choke member 26 and closing off the flow. In the modification according to FIG. 7, there is a bleeder flow through the diametrical bore 34 and the axial bore 35 in the valve plug 30.

The opening of the valve at high pressure is determined by the setting of the adjusting stem 62. As the fluid pressure increases the floating piston 47 moves upward until the flange 53a on the spacing member 53 abuts the bottom of the adjusting stem 62, carrying the valve plug 30 upward and lifting the valve member 32 off of the seat 29 in the choke member 26. The coiled compression spring 38 absorbs the shock of the valve plug 30, when it snaps open and lifts the valve member 32 off the seat 29.

As an example, assume that when shutting in a well the pressure is 500 pounds per square inch. When the well starts flowing, the pressure will gradually decrease to zero. Then, when shutting in the well again, the pressure will increase to 500 pounds per square inch.

By means of the adjusting nut 59, the spring 64b is compressed to shut in the well at any desired pressure, for instance 100 pounds per square inch. The adjusting stem 62 is set so that the valve plug 30 will lift the valve member 32 off the valve seat 29 in the choke member 26 at 500 pounds per square inch.

Having now fully described my invention, what I claim as new and useful and desire to secure by Letters Patent of the United States is:

A stop cock choke valve comprised by a body having a hollow inlet boss, a hollow outlet boss and a third boss aligned with said outlet boss, a valve seat in said outlet boss, a reciprocable valve member mounted to contact said valve seat at one limit of its movement, a cylinder mounted in said third boss and having a piston chamber therein, a valve stem carrying said valve member and extending into said piston chamber at one end of the latter, said valve stem and piston chamber being formed to provide a fluid communication between the piston chamber and the interior of the inlet and third bosses, a movable spacing member extending into said piston chamber at the other end of the latter, a free piston guided in said piston chamber and contacting the valve stem on one face and the movable spacing member on the other face, a guide cylinder connected to the other end of said first cylinder, an adjusting nut mounted in one end of said guide cylinder, a valve adjusting rod connected to said valve stem and extending through said free piston, movable spacing member and adjusting nut, an adjusting sleeve extending through said adjusting nut, connected to and surrounding said valve adjusting rod and contacting said movable spacing member, and a coiled compression spring positioned within said guide cylinder and abutting the adjusting nut at one end and the spacing member at the other end.

References Cited in the file of this patent

UNITED STATES PATENTS

| | | |
|---|---|---|
| 2,619,915 | Ifield | Dec. 2, 1952 |
| 2,942,622 | Hahn | June 28, 1960 |
| 2,955,614 | Meynig | Oct. 11, 1960 |